(No Model.) 2 Sheets—Sheet 1.

M. M. BELKNAP.
COMBINED CUPBOARD AND SINK.

No. 587,113. Patented July 27, 1897.

Witnesses
Geo. E. Frech.
J. A. Willson.

Inventor
Mary M. Belknap.
By H. B. Willson.
Attorney (No Model.) 2 Sheets—Sheet 2.

M. M. BELKNAP.
COMBINED CUPBOARD AND SINK.

No. 587,113. Patented July 27, 1897.

Witnesses
Geo. E. French
J. A. Willson

Inventor
Mary M. Belknap
By H. B. Willson
Attorney

THE NORRIS PETERS CO., PHOTO-LITHO., WASHINGTON, D. C.

UNITED STATES PATENT OFFICE.

MARY M. BELKNAP, OF EAGLE, PENNSYLVANIA.

COMBINED CUPBOARD AND SINK.

SPECIFICATION forming part of Letters Patent No. 587,113, dated July 27, 1897.

Application filed August 19, 1896. Serial No. 603,218. (No model.)

*To all whom it may concern:*

Be it known that I, MARY M. BELKNAP, a citizen of the United States, residing at Eagle, in the county of Warren and State of Pennsylvania, have invented certain new and useful Improvements in a Combined Cupboard and Sink; and I do declare the following to be a full, clear, and exact description of the invention, such as will enable others skilled in the art to which it appertains to make and use the same.

My invention has relation to improvements in combined cupboards and sinks for household use; and the object of the invention is to provide a simple, cheap, and convenient cabinet of this kind.

To this end the novelty consists in the construction, combination, and arrangement of the same, as will be hereinafter more fully described, and particularly pointed out in the claim.

In the accompanying drawings the same figures of reference indicate the same parts of the invention.

Figure 1:
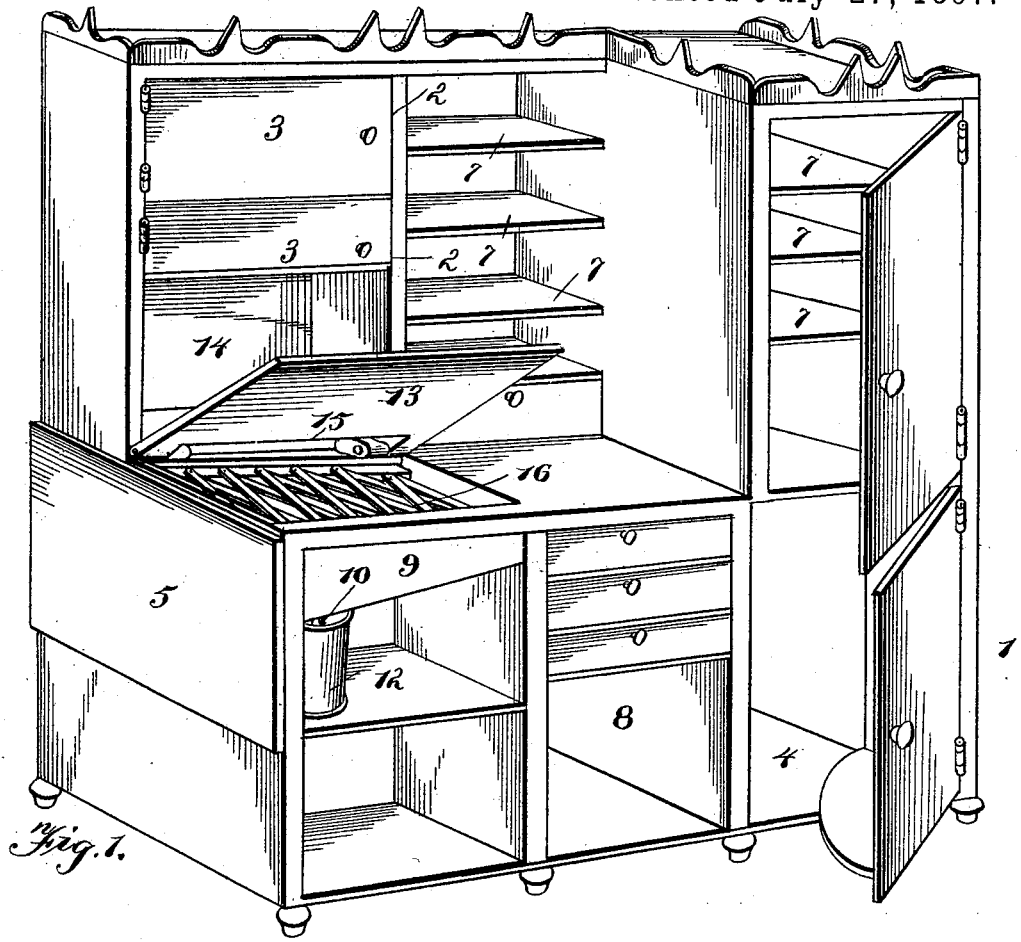
Figure 3:
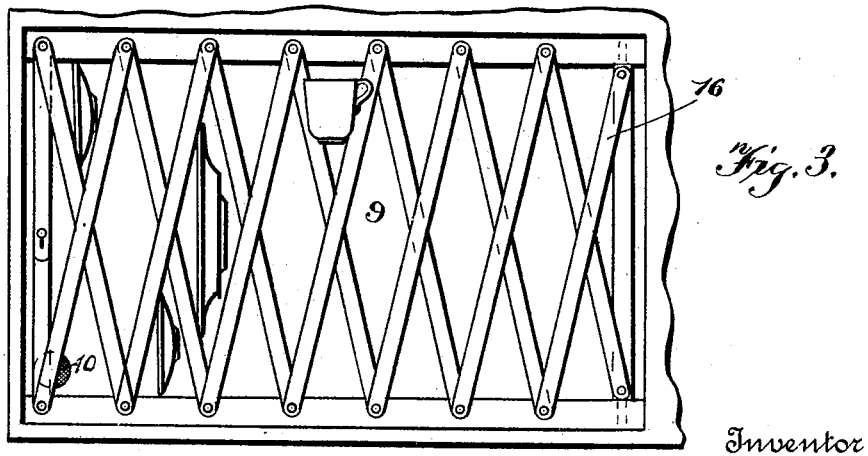
Figure 2:
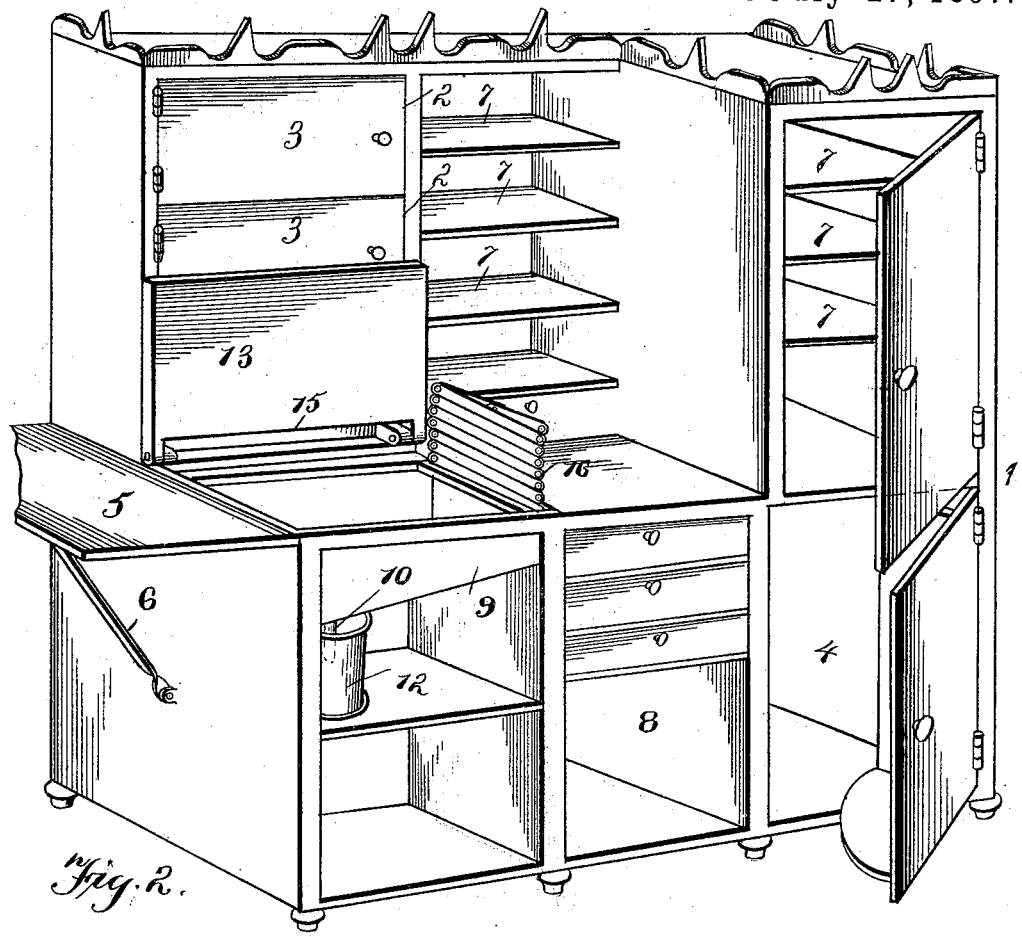
Figure 4:
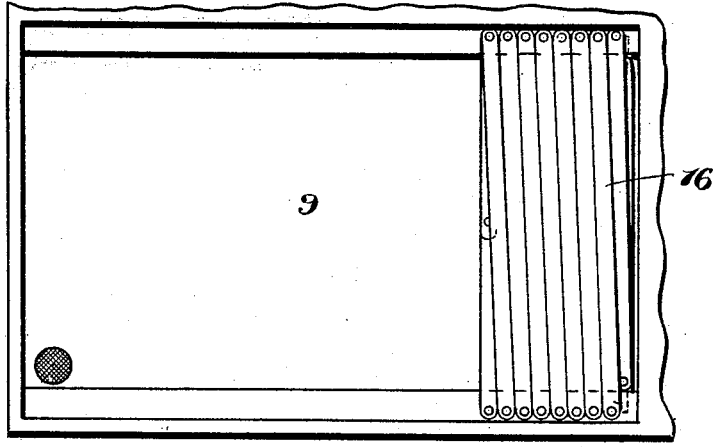

Figure 1 is a perspective view of my improved kitchen-cabinet. Fig. 2 is a similar view. Fig. 3 shows the dish-draining rack in operation, and Fig. 4 is a detail of the same folded.

1 represents the cabinet proper, and it may be of any suitable height, width, and length to suit the purposes to which it is intended.

2 2 2 are small compartment-cupboards provided with doors 3 3 3, and 4 is the flour-safe, preferably lined with sheet zinc or tin for protecting its contents from vermin.

5 is a shelf hinged to the left-hand side of the cabinet and supported in a horizontal position by a folding bracket 6, which permits the shelf to be lowered out of the way when not in use.

7 7 7 are the usual stationary shelves for general utility, and in the bottom part is a cupboard 8 for pots and kettles, and above the cupboard is a series of drawers.

9 is the usual metallic sink, having a waste-pipe 10, by means of which the contents of the sink are received in a removable pail 12, or, if more convenient, the waste-pipe 10 may be connected direct to a sewer-pipe.

13 is the folding mold or bread board, which when not in use is closed over and forms a door for the apartment 14 to protect its contents, and when in use as a bread-board is lowered down over the sink. It is provided with a recess 15, by means of which the refuse matter after making bread may be scraped directly into the sink.

16 is the adjustable dish-rack, fitting over the sink, and when the dishes are placed in it the rinsing-water may be poured directly over them, from whence it runs into the sink. This rack consists of a series of bars pivoted together in lazy-tongs order, so that it may be compressed, as shown in Fig. 4, to allow the refuse matter scraped from the board 13 to fall through the slot 15 directly into the sink without coming in contact with the rack and soiling it. In order to allow of the cleaning of the sink, I provide one of the bars with trunnions, which are journaled in the frame of the cabinet, so that the rack may be tilted up from over the sink to allow of free access thereto.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

In a combined cupboard and sink, the combination with the sink-trough, of a hinged compressible draining-rack located across the top of the same.

In testimony whereof I hereunto affix my signature in presence of two witnesses.

MARY M. BELKNAP.

Witnesses:
 E. E. McDOWELL,
 DANIEL McGRATH.